（12） United States Patent
Kato et al.

(10) Patent No.: US 7,121,737 B2
(45) Date of Patent: Oct. 17, 2006

(54) LIGHT EMITTING UNIT OPERATIVE AT HIGH COUPLING EFFICIENCY, OPTICAL SENSOR SYSTEM AND MUSICAL INSTRUMENT USING THE SAME

(75) Inventors: Tadaharu Kato, Shizuoka-ken (JP); Shigeru Muramatsu, Shizuoka-ken (JP); Tsutomu Sasaki, Shizuoka-ken (JP)

(73) Assignee: Yamaha Corporation, Shizuoka-ken (JP)

( * ) Notice: Subject to any disclaimer, the term of this patent is extended or adjusted under 35 U.S.C. 154(b) by 279 days.

(21) Appl. No.: 10/420,312

(22) Filed: Apr. 22, 2003

(65) Prior Publication Data

US 2003/0202753 A1  Oct. 30, 2003

(30) Foreign Application Priority Data

Apr. 26, 2002  (JP) .................................... 2002-125867

(51) Int. Cl.
*G02B 6/00* (2006.01)
*G02B 6/36* (2006.01)

(52) U.S. Cl. ........................................ 385/88; 385/147
(58) Field of Classification Search ............. 385/88–94, 385/147; 250/227; 340/539; 324/96
See application file for complete search history.

(56) References Cited

U.S. PATENT DOCUMENTS

| 4,503,326 A | * | 3/1985 | Searle ................... 250/227.28 |
| 5,012,182 A | * | 4/1991 | Fujiki et al. .................. 324/96 |
| 5,531,664 A | * | 7/1996 | Adachi et al. ............. 600/149 |

FOREIGN PATENT DOCUMENTS

JP  2001-118411  * 4/2001

* cited by examiner

*Primary Examiner*—Akm Enayet Ullah
(74) *Attorney, Agent, or Firm*—Harness, Dickey & Pierce, P.L.C.

(57) ABSTRACT

A light emitting device includes an optical fiber plug formed with a through-hole into which a bundle of optical fibers is inserted and a light-emitting device holder formed with a through-hole in which a condenser lens and a light emitting device are accommodated, and the optical fiber plug is assembled with the light-emitting device holder so that the light emitting device is optically coupled to the optical fiber through the condenser lens; a positioning device, a hyperboloid lens surface or a reflecting surface is formed in the optical fiber plug/light emitting device holder, condenser lens or the inner surface of the light-emitting device holder so that the light incident on the light input end is increased by virtue of the exact positioning between the optical fiber and optical axis, reduction of aberration or increase of light directed to the condenser lens.

24 Claims, 5 Drawing Sheets

LIGHT EMITTING UNIT OPERATIVE AT HIGH COUPLING EFFICIENCY, OPTICAL SENSOR SYSTEM AND MUSICAL INSTRUMENT USING THE SAME

FIELD OF THE INVENTION

This invention relates to a light emitting unit and, more particularly, to a light emitting unit for supplying light to an optical fiber, an optical sensor system using the same and a musical instrument equipped with the optical sensor system.

DESCRIPTION OF THE RELATED ART

Optical fibers have found wide varieties of application fields. The optical fibers are so flexible that user can easily route the optical fibers in a narrow crowded space. In fact, the optical fibers have been used as data transmission lines in a musical instrument such as, for example, a composite keyboard instrument. The composite keyboard instrument is designed on the basis of an acoustic piano. The component parts such as keys, key action units, hammers, dampers and strings are packed in a narrow space inside a cabinet. The keys are linked with the key action units and damper units, and the hammers are driven for rotation by depressed keys so as to strike the associated strings. The strings vibrate for generating acoustic piano tones.

The composite keyboard instrument can generate electronic tones instead of the acoustic piano tones. In order to generate the electronic tones, the composite keyboard instrument requires various sensors for the fingering on the keyboard. The sensors monitor the keys and hammers, and notify a controller of present key positions and present hammer positions. A light source and a light-to-current converter are remote from the keys and hammers, and the pieces of positional data representative of the present key positions and present hammer positions are transmitted between the light source/light-to-current converter and optical sensor heads through the optical fibers. Although the action units, hammers, dampers and strings are crowded in the narrow space, the manufacturer easily routes the optical fibers between the sensors and the controller.

At least a light emitting device, a pair of optical fibers, a light detecting device, a pair of optical sensor heads and a shutter plate are required for each key or each hammer. The shutter plate is secured to each key or hammer, and the optical sensor heads are opposed to one another across the trajectory of the shutter plate. One of the optical fibers is connected between the light emitting device and one of the optical sensor heads, and the other optical fiber is connected between the other optical sensor head and the light detecting device. The light emitting device emits light, and the light is incident onto the optical fiber. The light is propagated through the optical fiber to the optical sensor head, and a light beam is radiated from the optical sensor head to the other sensor head. The light is propagated through the optical fiber to the light detecting device, and the light detecting device converts the light to electric current. When the player depresses the key, or when the action unit drives the hammer for rotation, the shutter plate is moved along the trajectory together with the key or hammer, and gradually interrupts the light beam. The amount of light at the light detecting device is reduced, and, accordingly, the electric current is reduced. Thus, the shutter position or key/hammer position is converted to the amount of electric current, and the controller decides the present key position or present hammer position on the basis of the amount of electric current.

The light-emitting device is coupled to the optical fiber by means of an optical fiber connector. The light emitting device and the optical fiber are inserted from both sides into the optical fiber connector, and are opposed to each other in the optical fiber connector. When the light emitting device is energized, the light is emitted from the light emitting device, and is incident onto the light input end of the optical fiber. The light emitting device emits the light at wide angle, and only part of the light is incident on the light input end of the optical fiber. The other part of the light is decayed and absorbed inside the optical fiber connector. This is uneconomical. In the following description, term "coupling efficiency" means that ratio of the light incident onto the light input end of the optical fiber to the light emitted from the light source.

In order to increase the light incident onto the optical fiber, a condenser lens is provided between the light emitting device and the light input end of the optical fiber. The condenser lens has a convex spherical surface, and the optical fiber connector keeps the light input end of the optical fiber opposed to the condenser lens. The light, which is emitted from the light emitting device, passes through the convex spherical surface, and is condensed around the light input end of the optical fiber.

A problem is encountered in the prior art light emitting unit in low coupling efficiency. The present inventors reason the low coupling efficiency as follows. If the light input end of the optical fiber is exactly disposed at a target position on the optical axis of the condenser lens, a large amount of light will be incident on the light input end of the optical fiber. However, the optical fiber connector can not guarantee that the light input end of the optical fiber should be disposed at the target position on the optical axis of the condenser lens. In other words, the center of the light input end is liable to be offset from the optical axis of the condenser lens. Even if the center of the light input end is aligned with the optical axis of the condenser lens, the amount of incident light will be small under the condition that the light input end is widely spaced from the focal point. Thus, the deviation from the target position is causative of the low coupling efficiency.

Another reason for the low coupling efficiency is the aberration. The aberration is unavoidable in the spherical surface convex lens. Even if the light input end is disposed at the target position, the light intensity is dispersed on the light input end. When the light intensity is maximized at a certain point on the light input end, the light intensity at another point is less than that at the certain point. When the light intensity is maximized at another point, the light intensity is reduced at the certain point. Thus, the aberration is also causative of the low coupling efficiency.

Yet another reason for the low coupling efficiency is the attenuation and absorption on the inner surface of the optical fiber connector.

SUMMARY OF THE INVENTION

It is therefore an important object of the present invention to provide a light emitting unit, which achieves large coupling efficiency between a light emitting device and an optical fiber or fibers.

It is also an important object of the present invention to provide an optical sensor system, which distributes a large amount of light to optical sensor heads.

It is another important object of the present invention to provide a musical instrument, which is equipped with the optical sensor system.

In accordance with one aspect of the present invention, there is provided a light emitting unit comprising a light emitting device for converting electric power to light, at least one optical fiber having a light input end on which the light is incident, a condenser lens having an optical axis and provided between the light emitting device and the light input end for condensing the light onto the light input end, a casing formed with a hollow space for keeping the light emitting device, the condenser lens and the light input end at intervals, and a light increaser formed in at least one of the casing, the condenser lens and the inner surface of the casing defining the hollow space for increasing the amount of light incident onto the light input end.

In accordance with another aspect of the present invention, there is provided an optical sensor system comprising at least one outward optical fiber having a first light input end and a first light output end and offering an outward path to a light, at least one light radiating optical sensor head connected to the first light output end and radiating the light in a certain direction, at least one light receiving optical sensor head opposed to the at least one light radiating optical sensor head and receiving the light radiated from the at least one light radiating optical sensor head, at least one homeward optical fiber having a second light input end connected to the at least one light receiving optical sensor head and a second light output end and offering a homeward path to the light, at least one obstacle secured to a moving object and having a trajectory across the light radiated from the at least one light radiating optical sensor head to the at least one light receiving optical sensor head for intersecting the light during a travel along the trajectory, a light detecting unit connected to the second light output end for converting the light to an electric signal and a light emitting unit connected to the first light input end, and the light emitting unit includes a light emitting device for converting electric power to the light, a condenser lens having an optical axis and provided between the light emitting device and the first light input end for condensing the light onto the first light input end, a casing formed with a hollow space for keeping the light emitting device, the condenser lens and the first light input end at intervals and a light increaser formed in at least one of the casing, the condenser lens and the inner surface of the casing defining the hollow space for increasing the amount of the light incident onto the first light input end.

In accordance with yet another aspect of the present invention, there is provided a musical instrument for electronically generating sound comprising a sound generating system for electronically generating the sound, at least one movable object moved by a player for requesting the sound generating system to electronically generate the sound and an optical sensor system monitoring the at least one movable object and connected to the sound generating system for notifying the sound generating system of the player's request, and the optical sensor system includes at least one outward optical fiber having a first light input end and a first light output end and offering an outward path to a light, at least one light radiating optical sensor head connected to the first light output end and radiating the light across a trajectory of the at least one movable object, at least one light receiving optical sensor head opposed to the at least one light radiating optical sensor head and receiving the light radiated from the at least one light radiating optical sensor head across the trajectory, at least one homeward optical fiber having a second light input end connected to the at least one light receiving optical sensor head and a second light output end and offering a homeward path to the light, at least one obstacle secured to the at least one moving object, intersecting the light during a travel of the at least one moving object along the trajectory, a light detecting unit connected to the second light output end for converting the light to an electric signal representative of the player's request and a light emitting unit connected to the first light input end and having a light emitting device for converting electric power to the light, a condenser lens having an optical axis and provided between the light emitting device and the first light input end for condensing the light onto the first light input end, a casing formed with a hollow space for keeping the light emitting device, the condenser lens and the first light input end at intervals and a light increaser formed in at least one of the casing, the condenser lens and the inner surface of the casing defining the hollow space for increasing the amount of the light incident onto the first light input end.

BRIEF DESCRIPTION OF THE DRAWINGS

The features and advantages of the light emitting unit and optical sensor system will be more clearly understood from the following description taken in conjunction with the accompanying drawings, in which.

DESCRIPTION OF THE PREFERRED EMBODIMENTS

First Embodiment

Keyboard Musical Instrument

Figure 1:
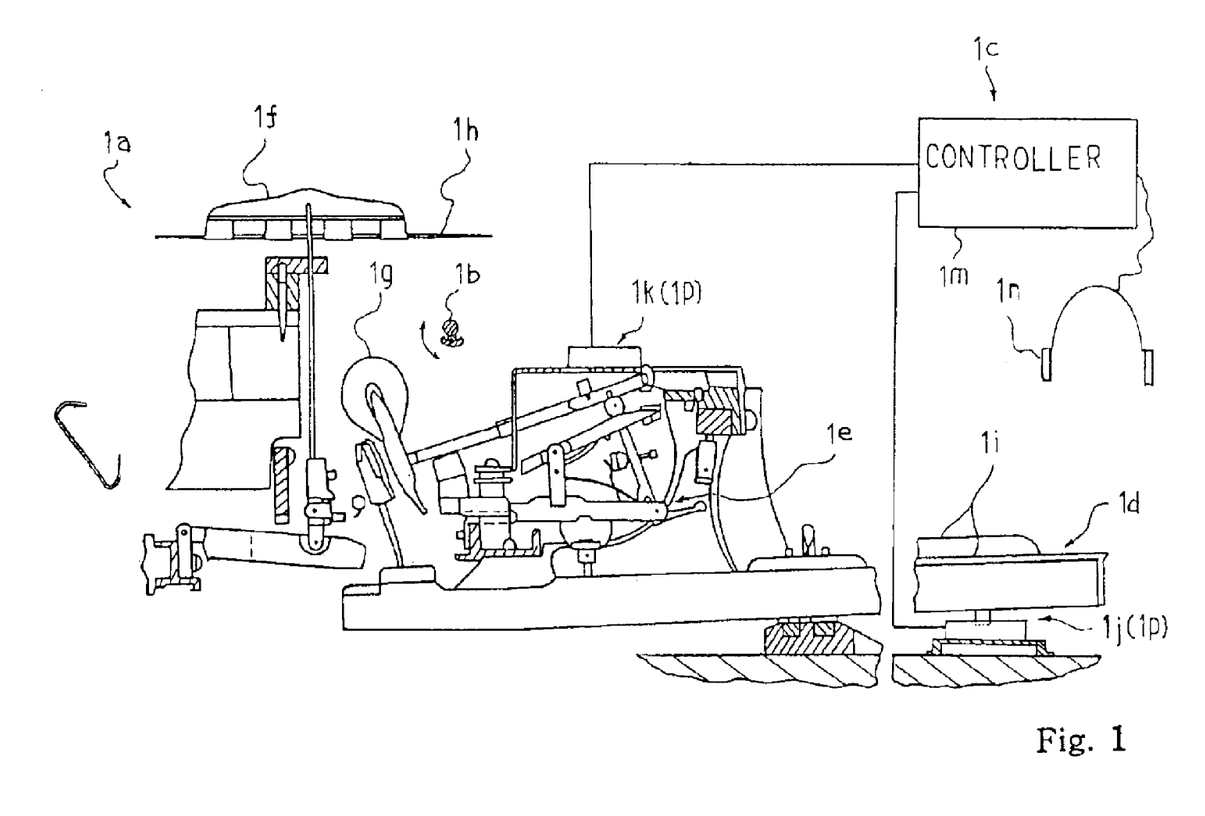
FIG. 1 is a schematic side view showing the structure of a composite keyboard musical instrument according to the present invention.

Referring to FIG. 1 of the drawings, a composite keyboard musical instrument largely comprises an acoustic piano 1a, a hammer stopper 1b and an electronic tone generating system 1c. While a user is keeping the hammer stopper 1b at a free position, acoustic piano tones are selectively generated from the acoustic piano 1a through fingering. When the user changes the hammer stopper 1b to a blocking position, the hammer stopper 1b prohibits the acoustic piano 1a from generating the acoustic piano tones. The electronic tone generating system 1c responds to user's fingering, and generates electronic tones instead of the acoustic piano tones.

The acoustic piano 1a includes a keyboard 1d, action units 1c, dampers 1f, hammers 1g and strings 1h. Eighty-eight black/white keys 1i are incorporated in the keyboard 1d. The user selectively depresses and releases the black/white keys 1i. The depressed keys 1i make the dampers 1f spaced from the strings 1h, and actuate the associated action units 1e. The action units 1e drive the associated hammers for rotation through escape, and the hammers 1g are moved along trajectories toward the associated strings 1h. The user is assumed to have changed the hammer stopper 1b to the free position. The hammer stopper 1b is out of the trajectories of the hammers 1g so that the hammers 1b strike the associated strings 1h at the end of the free rotation. If, on the other hand, the user has changed the hammer stopper 1b to the blocking position, the hammer stopper 1b enters the trajectories of the hammers 1g so that the hammers 1g rebound on the hammer stopper 1b before striking the strings 1h.

The electronic tone generating system 1c includes key sensors 1j, hammer sensors 1k, a controller 1m and a sound system provided with a headphone 1n. The key sensors 1j monitor the black/white keys 1i, respectively, and supply key position signals representative of present key positions to the controller 1m. Similarly, the hammer sensors 1k monitor the hammers 1g, and supply hammer position signals representative of present hammer positions to the controller 1m.

The controller 1m periodically checks the signal ports assigned to the key position signals and hammer position signals, and accumulates pieces of key position data and pieces of hammer position data in an internal memory. The controller 1m analyzes the accumulated data representative of the present key positions to see whether or not the user depresses or releases the black/white keys 1i. When the controller 1m acknowledges that the user depresses or releases the black/white key 1i, the controller 1m decides a note-on event and/or a note-off event, and gets ready to generate electronic tones or decay the electronic tones. The controller 1m further analyzes the accumulated data representative of the present hammer positions for the depressed keys 1i, and calculates the hammer velocity. When the note-on event takes place, a key assignor, which forms a part of the controller 1m, assigns a channel to each depressed key, and a series of waveform data is read out from a waveform memory, which also forms a part of the controller 1m. The series of waveform data is converted to an analog audio signal, and the analog audio signal is supplied to the headphone 1n for being converted to the electronic tone. On the other hand, when the note-off event takes place, the key assignor instructs the channel to stop the data read-out, and the analog audio signal is delayed.

Figure 2:
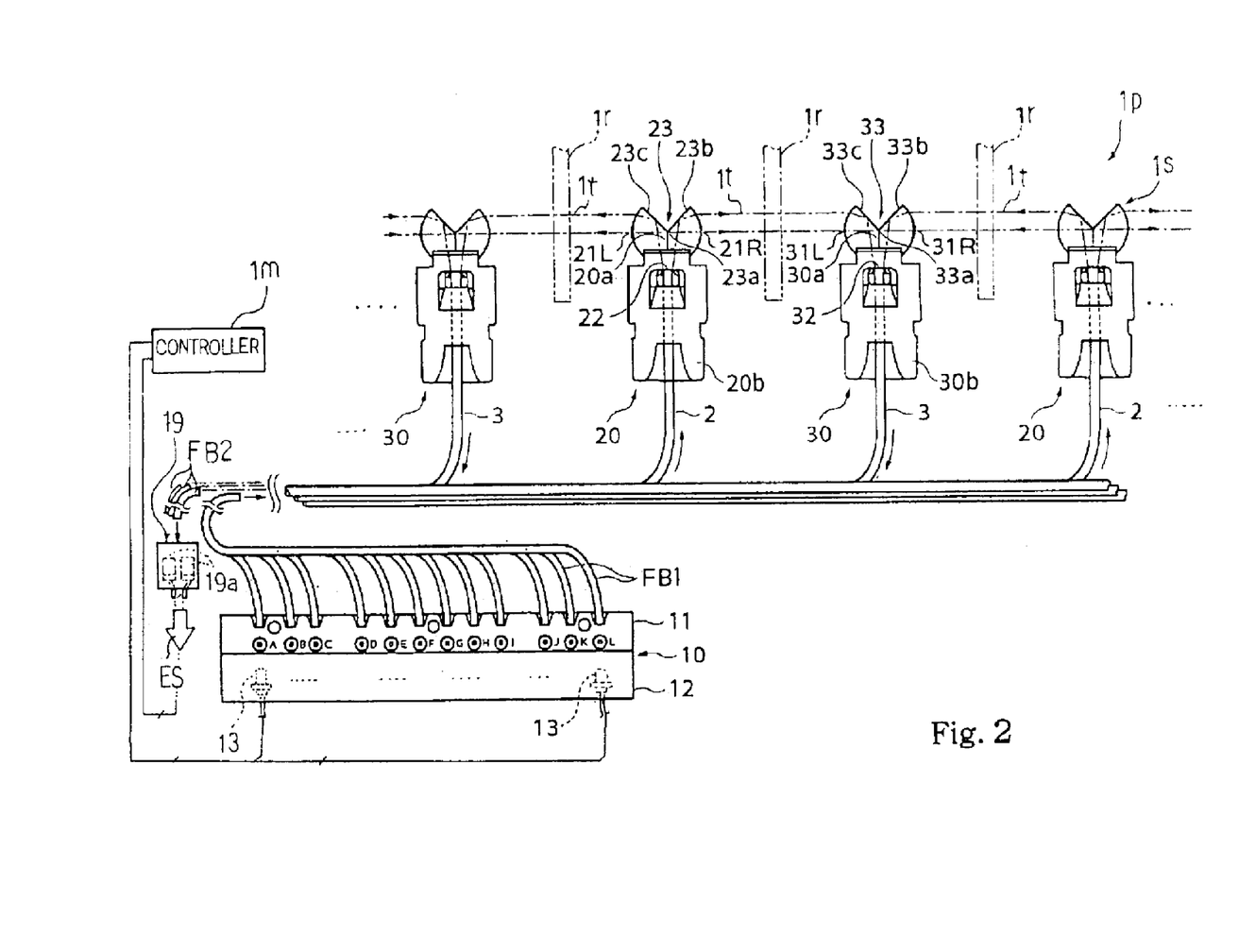
FIG. 2 is a bottom view showing the arrangement of system components incorporated in an optical sensor system according to the present invention.

The key sensors 1j and hammer sensors 1k are similar in system configuration to each other, and, for this reason, the key sensors 1j and hammer sensors 1k are hereinafter described in detail as an optical sensor system 1p with reference to FIG. 2.

Optical Sensor System

The optical sensor system 1p includes shutter plates 1r and an optical sub-system 1s. The shutter plates 1r are secured to the lower surfaces of the black/white keys 1i and hammer shanks of the hammers 1g so that the shutter plates 1r are moved together with the black/white keys 1i and hammers 1g along the trajectories. The optical sub-system 1s radiates light beams 1t across the trajectories, and converts the light to the key position signals and hammer position signals.

The optical sub-system 1s includes optical fibers 2 for outward optical paths, optical fibers 3 for homeward paths, a light emitting unit 10, a light detecting unit 19, light-radiating optical sensor heads 20 and light-receiving optical sensor heads 30. The optical fibers 2/3 are made of transparent synthetic resin such as, for example, acrylic resin, and have the diameter of the order of 0.5 millimeter. The optical fibers 3 also have the diameter of the order of 0.5 millimeter. The optical fibers 2 form plural bundles FB1, and the optical fibers 3 also form plural bundles FB2. The light emitting unit 10 is connected at the light output ports A, B, C, D, E, F, G, H, I, J, K and L to the twelve bundles FB1 of optical fibers 2, and the optical fibers 2 of each bundle FB1 are separated from one another so as to be connected at the other ends thereof to the light-radiating optical sensor heads 20. In this instance, the bundle FB1 includes two-five optical fibers 2. Only one optical fiber may be connected to the light output port of the light emitting unit 10.

Though not shown in the drawings, a time frame is repeated in the control sequence for the optical sub-system 1s, and each time frame has twelve time slots respectively assigned light output ports A to L of the light-emitting unit 10. The light-emitting unit 10 sequentially radiates light from the light output ports A to L to the associated bundles FB1, and the light is incident into the optical fibers 2 of the associated bundle FB1 at each light output port A, . . . or L. In other words, the light is radiated from one light output port to another light output port, and is incident onto the optical fibers 2 of the associated bundle FB1 in associated one of the time slots.

A typical example of the controlling method for the optical sub-system 1s is disclosed in Japan Patent Application laid-open No. 9-152871. A matrix of switching element is connected between the light-emitting unit 10 and the light-detecting unit 19, and the controller 1m specifies the black/white key 1i or hammer 1g on the basis of the combination of time slots and light input ports of the light-detecting unit 19. Light-detecting devices 19a are respectively associated with the light input ports, and convert the light to photo-current.

The light is propagated from the light output port A–L to the light-emitting sensor heads 20 through the optical fibers 2, and is radiated from each light-radiating optical sensor head 20 toward the light-receiving optical sensor heads 30 on both sides as the light beams 1t. The light beams 1t are incident into the light-receiving optical sensor heads 30, and the incident light is propagated through the optical fibers 3 to light input ports of the light-detecting unit 19. The light detecting devices 19a convert the light to the key/hammer position signals ES. The light radiated from one of the light output ports A–L reaches all of or selected ones of the light input ports of the light detecting unit 19. The light radiated from next light output port reaches all of or selected ones of the light input ports. The combinations between the light output ports A–L, i.e., the time slots and the light input ports are assigned to all the shutter plates 1r, respectively, and the controller 1m correlates the key/hammer position signals ES with the black/white keys 1i or hammers 1g.

The light-radiating sensor heads 20 are alternated with the light-receiving sensor heads 30, and the shutter plates 1r have the trajectories in the gaps between the light-emitting sensor heads 20 and the light-detecting sensor heads 30. The light-radiating sensor heads 20 and light-receiving sensor heads 30 are made of transparent synthetic resin such as, for example, acrylic resin. The light-radiating sensor heads 20 and light-receiving sensor heads 30 are shaped through a molding process.

Each of the light-emitting sensor heads 20 is broken down into a head portion 20a and a holder portion 20b. The holder portion 20b is formed with a narrow groove, and the associated optical fiber 2 is inserted into the narrow groove. The light output end 22 of the optical fiber 2 is directed to the head portion 20a. The head portion 20a is partially cut away like a V-letter, and reflecting surfaces 23b/23c define the V-letter shaped space 23. The head portion 20a is further formed with a pair of convex lenses 21L/21R, and the convex lenses 21L/21R are opposed to the adjacent light-detecting sensor heads 30.

The reflecting surface 23b abuts on the other reflection surface 23c along an edge 23a, and the reflection surfaces 23b/23c are spaced from one another by 90 degrees. The edge 23a is on the extension line of the center axis of the optical fiber 2 at the light output end 22, and the center axis of the optical fiber 2 is coincident with the perpendicular bisector of a virtual triangle defined by the reflection surfaces 23b/23c. When the light is radiated from the light output end 22 toward the reflection surfaces 23b/23c, the light is incident on the reflection surfaces 23b/23c, and is split into two light beams. The light beams are reflected on the reflection surfaces 23b/23c, and are directed to the convex lenses 21L/21R. The convex lenses 21R/21L convert the incident light to the parallel light, and the light beams 1t are radiated toward the adjacent light-receiving sensor heads 30.

The light-receiving sensor heads 30 are similar in configuration to the light-radiating sensor heads 20. Each of the light-receiving sensor heads 30 is also broken down into a head portion 30a and a holder portion 30b. The holder portion 30b is formed with a narrow groove, and the associated optical fiber 3 is inserted into the narrow groove. The head portion 30a is confronted with the light input end 32 of the optical fiber 3. The head portion 30a is partially cut away like a V-letter, and reflecting surfaces 33b/33c define the V-letter shaped space 33. The head portion 30a is further formed with a pair of convex lenses 31L/31R, and the convex lenses 31L/31R are opposed to the adjacent light-radiating sensor heads 30.

The reflecting surface 33b abuts on the other reflection surface 33c along an edge 33a, and the reflection surfaces 33b/33c are also spaced from one another by 90 degrees. The edge 33a is on the extension line of the center axis of the optical fiber 3, and the center axis of the optical fiber 3 is coincident with the perpendicular bisector of a virtual triangle defined by the reflection surfaces 33b/33c.

The light beam 1t is incident onto one of the convex lenses 31L/31R. The light beams 1t are never concurrently incident onto both convex lenses 31L/31R, because the light-radiating sensor heads 20 on both sides of each light-receiving sensor head 30 are assigned different two of the light output ports A to L. The convex lens 31L/31R concentrates the incident light beam 1t on certain areas on the associated reflection surface 33b/33c, and the reflection surface 33b/33c directs the light beam 1t to the light input end 32 of the optical fiber 3. The light is propagated through the optical fiber 3, and reaches the light-detecting unit 19. The light-detecting unit 19 includes the light-detecting devices 19a such as, for example, photo transistors, and the bundles FB2 of optical fibers are optically connected to the light-detecting devices 19a. The light-detecting devices 19a convert the light to the key position/hammer position signals ES.

Light-emitting Unit

Figure 3:
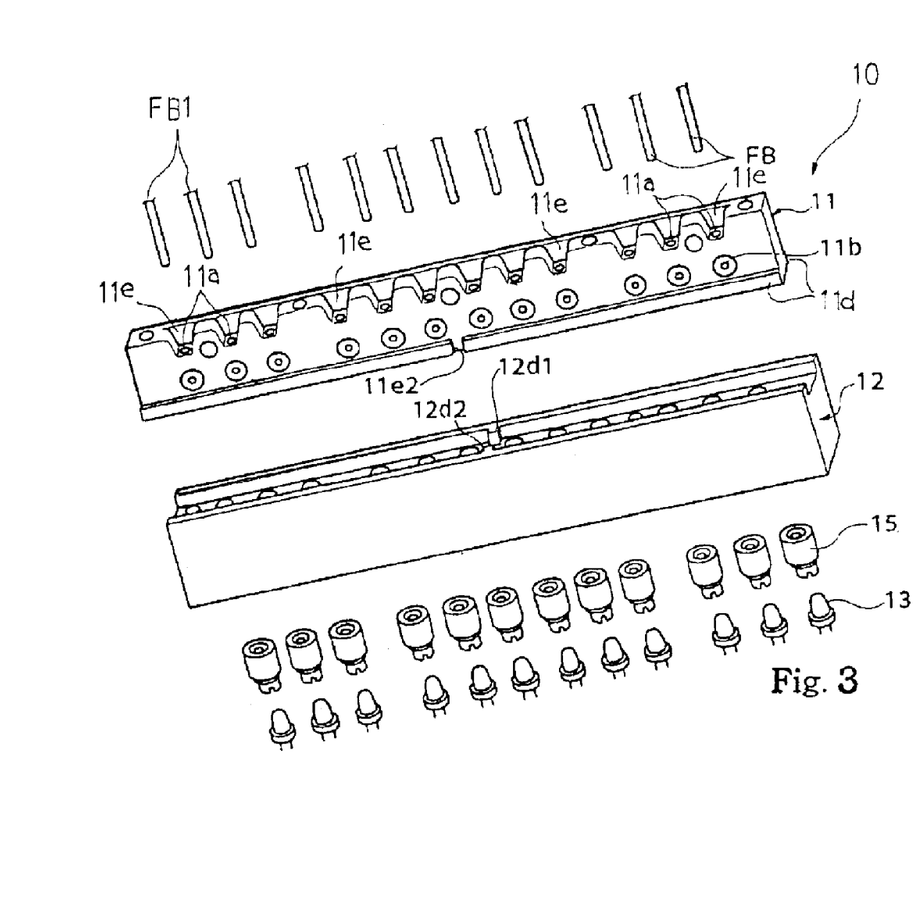
FIG. 3 is a fragmentary perspective view showing component parts of a light emitting unit according to the present invention.

Turning to FIG. 3 of the drawings, the light-emitting unit 10 includes an optical fiber plug 11, a light emitting diode socket 12, plural light emitting diodes 13 and plural condenser lens units 15. In this instance, the optical fiber plug 11 and light-emitting diode socket 12 as a whole constitute a multi-core optical fiber connector. In the following description, term "front" is indicative of a position closer to the bundles FB1 of optical fibers 2 than a "rear" position. For example, the optical fiber plug 11 is in front of the light-emitting diode socket 12, and the "front" is closer to the right side than the "rear" in FIGS. 4A and 4B.

The optical fiber plug 11 is a generally rectangular parallelepiped shape, and a pair of spigots 11d sideward projects from the rear end portion. Namely, the optical fiber plug 11 has a cross section like an inverted T-letter. In this instance, the optical fiber plug 11 is made of transparent synthetic resin such as, for example, polycarbonate.

Twelve cylindrical through-holes 11a are formed in the optical fiber plug 11. The cylindrical through-holes 11a extend in the fore-and-aft direction, and are open to valleys 11e and on the rear end surface 11c. The center axis of the cylindrical through-hole 11a is labeled with CL1 in FIG. 4A. The cylindrical through-holes 11a are respectively assigned to the bundles FB1 of optical fibers 2, and the center axis of the bundle FB1 is labeled with CL2. The cylindrical through-holes 11a have an inner diameter approximately equal to the outer diameter of the bundles FB1. For this reason, when the bundles FB1 of optical fibers 2 are inserted into the cylindrical through-holes 11a, the bundles FB1 are held in contact with the inner surfaces defining the through-holes 11a. Thus, the through-holes 11a and bundles FB1 automatically make the center axes CL1/CL2 coincident with one another. Twelve injection holes 11b are further formed in the optical fiber plug 11.

Figure 4A:
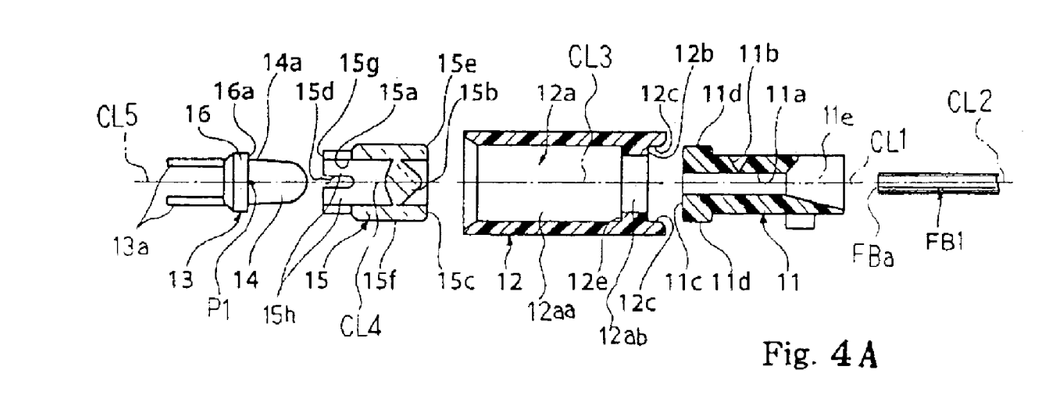
FIG. 4A is a fragmentary cross sectional view showing the component parts of the light emitting unit.

The injection holes 11b are respectively associated with the through-holes 11a, and are open on the side surface of the optical fiber plug 11 and to the associated through-holes 11a as will be better seen in FIG. 4A. The spigots 11d are partially removed from the optical fiber plug 11, and gaps 11e2 are formed in the split spigots 11d (see FIG. 3).

The light-emitting diode socket 12 has a generally rectangular parallelepiped shape, and is as long as the optical fiber plug 11. In this instance, the light-emitting diode socket 12 is made of copolymer of acrylonitril-butadiene-styrene, i.e., ABS resin. Twelve through-holes 12a are formed in the light-emitting diode socket 12, and are open to a socket 12c and at the other ends on the rear end surface. The centerline of the through-hole 12a is labeled with CL3. The through-holes 12a are broken down into rear zones 12aa and front zones 12ab. The rear zones 12aa are larger in diameter than the front zones 12ab, and, for this reason, shoulders 12e are formed between the rear zones 12aa and the front zones 12ab. The diameter of the front zones 12ab is less than the width of the socket 12c so that the front zones 12ab are open on the bottom surface 12b defining the bottom of the socket 12c. The rear zones 12aa are diverged in the rear end portion, and are open to the outside.

The socket 12c extends in the longitudinal direction of the light-emitting diode socket 12 like a groove, and has the constant width approximately equal to the distance between the end surfaces of the spigots 11d. For this reason, the pair of spigots 11d is snugly received in the socket 12c, and the rear surface 11c is brought into contact with the bottom surface 12b. The depth of socket 12c is less than the distance between the rear surface 11c and the injection hole 11b. Even when the rear end surface 11c is brought into contact with the bottom surface 12b, the injection hole 11b is outside of the socket 12c. Thus, the pair of spigots 11d is snugly received in the socket 12c, and the virtual plane where the centerlines CL3 extend is automatically aligned with the virtual plane where the centerlines CL1 extend.

The light-emitting diode socket 12 is formed with a pair of lugs 12d1/12d2. The lugs 12d1/12d2 project into the socket 12c (see FIG. 3), and are confronted with one another. The lugs 12d1/12d2 are spaced from the right surface of the light-emitting diode socket 12 by a predetermined distance, and the gaps 11e2 are also spaced from the right surface of the optical fiber plug 11 by the predetermined distance. The width of the lugs 12d1/12d2 is approximately equal to the width of the gaps 11e2 so that the lugs 12d1/12d2 are snugly received in the gaps 11e2. When the lugs 12d1/12d2 are received in the gaps 11e2, the right surface and left surface of the optical fiber plug 11 become coplanar with the right surface and left surface of the light-emitting diode socket 12, respectively, and the centerlines CL1 are automatically aligned with the centerlines CL3, respectively. Thus, the spigots and socket 11d/12c and the gaps and lugs 11e2/12d1/12d2 make the centerlines CL1 automatically aligned with the centerlines CL3, respectively.

The condenser lens units 15 have a generally cylindrical shape, and have respective cylindrical bodies 15f and respective deformable tails 15h. The condenser lens units 15 are made of transparent synthetic resin such as, for example, acrylic resin. Cylindrical recesses 15a are respectively formed in the condenser lens units 15, and have center axes CL4. The cylindrical recesses 15a penetrate from the rear end surfaces 15g through the tails 15h into the cylindrical bodies 15f, and slits 15d are formed in the tails 15h. In this instance, slits 15d are four so that each tail 15h is separated into four pieces. When the four pieces are pressed outwardly, the pieces are deformed in such a manner to increase the diameter of the cylindrical recess 15a.

The cylindrical bodies 15f are approximately equal in diameter to the rear zones 12aa of the through-holes 12a, and are larger in diameter than the front zones 12ab. For this reason, when the condenser lens units 15 are inserted into the through-holes 12a, the front surfaces 15c are brought into contact with the shoulders 12e, and the center axes CL4 become coincident with the center axes CL3, respectively.

Condenser lenses 15b define the bottoms of the cylindrical recesses 15a, and are slightly retracted from the front end surfaces 15c. In other words, guard portions 15e are formed in the cylindrical bodies 15f, and prevent the condenser lenses 15b from undesirable contaminant and mechanical damages. The cylindrical bodies 15f and associated condenser lenses 15b are formed through a molding process, by way of example, and are designed in such a manner that the condenser lenses 15b have respective optical axes coincident with the center axes CL4, respectively. The condenser lenses 15b are smaller in diameter than the front zones 12ab, and are larger in diameter than the bundle FD. The condenser lenses 15b condenses the light onto the bundles FB1 of optical fibers 2, and a large amount of light is incident on the end surfaces of the bundles FB1 of optical fibers 2 as will be hereinafter described in more detail.

The light emitting diodes 13 are similar in structure to one another. Each of the light emitting diodes 13 includes a disc-shaped substrate 16, a semiconductor light emitting diode P1 on the disc-shaped substrate 16, a semi-ellipsoid cover piece 14 and electrodes 13a. The semiconductor light emitting diode P1 is mounted on the front surface 16a of the disc-shaped substrate 16, and is covered with the semi-ellipsoid cover piece 14. Electric power is sequentially supplied from the controller 1m through the electrodes 13a to the semiconductor light emitting diodes P1, and causes the semiconductor light emitting diodes P1 to radiate laser light. The semi-ellipsoid cover piece 14 has a center axis CL5, and the semiconductor light emitting diode P1 is disposed at a certain point on the center axis CL5. The semi-ellipsoid cover piece 14 is transparent to the light radiated from the semiconductor light emitting diode P1. The disc-shaped substrate 16 is larger in diameter than the cylindrical recess 15a, and the semi-ellipsoid cover piece 14 is gradually increased in diameter toward the disc-shaped substrate 16. The diameter of the semi-ellipsoid cover piece 14 is maximized on the front surface 16a, and the maximum diameter is slightly greater than the diameter of the cylindrical recess 15a. When the light-emitting diode 13 is pushed into the cylindrical recess 15a, the semi-ellipsoid cover piece 14 is brought into contact with the condenser lens 15b defining the bottom of the cylindrical recess 15a, and the rear surface 15g is brought into contact with the peripheral area of the front surface 16a. The peripheral surface 14a pushes the separated tail 15h outwardly, and the separated pieces are deformed. For this reason, the resilient force is exerted on the peripheral surface 14a, and the semi-ellipsoid cover piece is clamped by the separated tail 15h. The cylindrical recess 15a is adopted to snugly receive the semi-ellipsoid cover piece 14. Moreover, the distance between the condenser lens 15b and the rear surface 15g is designed to be equal to the length between the surface 16a and the tip of the semi-ellipsoid cover 14. For this reason, when the light emitting diode 13 is inserted into the condenser lens unit 15, the center axis CL5 is made coincident with the center axis CL4, and the light emitting diode P1 is disposed at a certain point on the optical axis of the condenser lens 15b.

Those component parts 11, 12, 13 and 15 are assembled into the light emitting unit 10 as follows. The assembling method is broken down into two steps. In the first step, the light emitting diodes 13, condenser lens units 15 and light-emitting diode socket 12 are assembled together, and the bundles FB1 of optical fibers 2 are assembled with the optical fiber plug 11. Subsequently, the optical fiber plug 11 and light-emitting diode socket 12 are assembled into the light-emitting unit 10.

In the first step, two of the light emitting diodes 13, condenser lens units 15 and light-emitting diode socket 12 are assembled together, and, subsequently, the resultant structure is assembled with remaining one of the light emitting diodes 13, condenser lens units 15 and light-emitting diode socket 12.

In detail, the center axis CL5 of the light emitting diode 13 is roughly aligned with the center axis CL4 of the associated condenser lens unit 15, and each of the semi-ellipsoid cover piece 14 is pushed into the cylindrical recess 15a of the associated condenser lens unit 15. While the semi-ellipsoid cover piece 14 is advancing through the tail 15h, the semi-ellipsoid cover piece 14 is not brought into contact with the inner surface defining the tail 15h. When the semi-ellipsoid cover piece 14 deeply enters the cylindrical recess 15a, the peripheral surface 14a is brought into contact with the inner surface of the tail 15h. Then, the assembling worker strongly pushes the light-emitting diode 13 into the cylindrical recess 15a. The peripheral surface 14a pushes the separated tail 15h away so that the tail 15h is outwardly deformed. The deformed tailpieces exert the resilient force on the semi-ellipsoid cover piece 14, and make the center axis CL5 aligned with the center axis CL4. When the rear surface 15g is brought into contact with the peripheral area of the front surface 16a, the semi-ellipsoid cover piece 14 reaches the rear convex surface of the condenser lens 15b, and the condenser lens unit 15 clamps the semi-ellipsoid cover piece 14 with the resiliently deformed tail 15h. Thus, the condenser lens unit 15 keeps the centerline CL5 of the light emitting diode 13 aligned with the centerline CL4 and, accordingly, the optical axis AX of the condenser lens 15b.

In order to assemble the condenser lens units 15 with the light-emitting diode socket 12, the center axis CL4 of each condenser lens unit 15 is roughly aligned with the center axis CL3 of the associated through-hole 12a. The condenser lens units 15 are moved into the associated through-holes 12a.

Figure 4B:
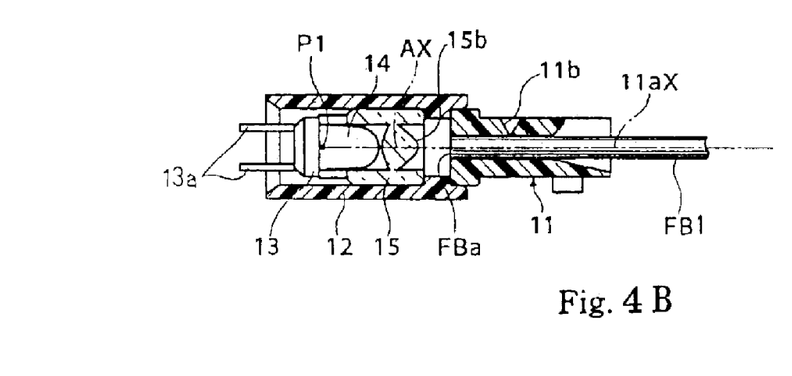
FIG. 4B is a cross sectional view showing the component parts assembled into the light emitting unit.

The rear diverged portions of the through-holes 12a guide the condenser lens units 15 to the remaining portions of the through-holes 12a, and automatically make the center axes CL4 respectively aligned with the center axes CL3. The cylindrical bodies 15f are driven to slide on the inner surfaces defining the associated through-holes 12a, and the front surfaces 15c advance toward the shoulder portions 12e. When the front surfaces 15c are brought into contact with the shoulder portions 12e, the condenser lens units 15 are assembled with the light-emitting diode socket 12 with the center axes CL3/CL4 coincident with one another. The optical axes AX of the condenser lenses 15b are also coincident with the centerlines CL3, respectively. However, the condenser lenses 15b are still spaced from the front zones 12ab as shown in FIG. 4B.

On the other hand, the bundles FB1 of optical fibers 2 are assembled with the optical fiber plug 11 as follows. First, the center axes CL2 of the bundles FB1 of optical fibers 2 are roughly aligned with the center axes CL1 of the through-holes 11a, and the bundles FB1 of optical fibers 2 are moved into the valleys 11e. The valleys 11e guide the bundle FB1 of optical fibers 2 to the through-holes 11a, and the end surfaces FBa are inserted into the through-holes 11a. Then, the center axes CL2 are aligned with the center axes CL1 of the through-holes 12a. The bundles FB1 of optical fibers 2 advance toward the rear surface 11c, and the end surfaces FBa rearward project over the rear surface 11c. The length of the projecting portions may be irregular.

Transparent adhesive compound liquid is injected into the injection holes 11b. The adhesive compound liquid penetrates into the through-holes 11a so that the bundles FB1 of optical fibers are adhered to the inner surfaces defining the through-holes 11a. Moreover, the optical fibers 2 of each bundle FB1 are adhered to one another. Finally, the projecting portions are cut away from the bundles FB1 so that the fresh end surfaces FBa are substantially coplanar with the rear surface 11c of the optical fiber plug 11.

Upon completion of the first step, the optical fiber plug 11 is assembled with the light-emitting diode socket 12. The lugs 12d1/12d2 are roughly aligned with the gaps 11e2, and the pair of spigots 11d of the optical fiber plug 11 is pressed into the socket 12c. The lugs 12d1/12d2 are snugly received in the gaps 11e2, and the lugs 12d1/12d2 and gaps 11e2 make the center axes CL1/CL2 aligned with the center axes CL3/CL4/CL5. The resultant structure of the light-emitting unit 10 is shown in FIG. 4B.

As will be understood, the component parts 11, 12, 13 and 15 are designed in such a manner that the center axes CL2 of the bundles FB are automatically aligned with the center axes CL1/CL3/CL4/CL5 of the component parts 11, 12, 13 and 15, and, accordingly, the optical axes AX of the condenser lenses 15b are coincident with the centerlines CL2 of the bundles FB1 of optical fibers 2. Thus, optical fiber plug 11, light-emitting diode socket 12, condenser lens units 15 and light emitting devices 13 automatically make the bundles FB1 of optical fibers 2 put the light input end surfaces FBa on the optical axes AX of the associated condenser lenses 15b. For this reason, a large amount of light is incident onto the light input end surface of each bundle FB1. In other words, the coupling efficiency is surely improved. This means that a large amount of light forms the light beams 1t. The large amount of light makes the signal-to-noise ratio large. Thus, the optical sensor system 1p exactly reports the key/hammer motion to the controller 1m.

Moreover, the assembling work is simple and easy for the assembling workers, and the optical fibers 2 are hardly pulled out from the optical fiber plug 11 by virtue of the adhesive compound. In other words, the optical system 1s is stable.

Second Embodiment

Figure 5:
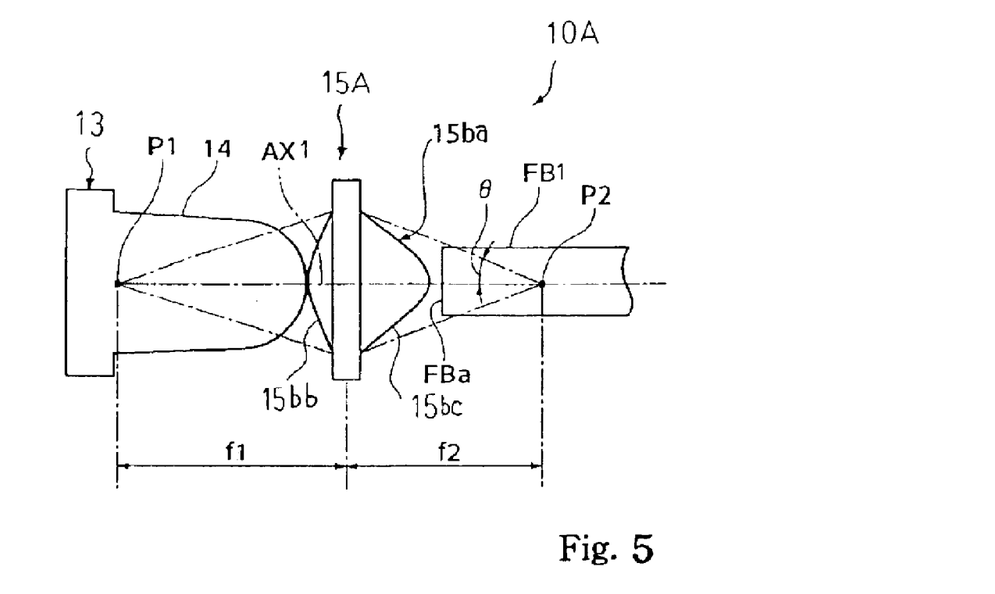
FIG. 5 is a schematic view showing the arrangement of a light emitting diode, a condenser lens and a bundle of optical fibers incorporated in another light emitting unit according to the present invention.

Turning to FIG. 5 of the drawings, another light emitting unit 10A embodying the present invention includes light emitting diodes 13 and condenser lens units 15A. The light emitting unit 10A forms a part of the optical sensor system, which is incorporated in the keyboard musical instrument. In other words, the condenser lens units 15 are replaced with the condenser lens units 15A. Although the bundle FB1 and the condenser lens units/light emitting diodes 15A/13 are maintained in an optical fiber plug and a light emitting device holder, the optical fiber plug and light emitting device holder are not shown in FIG. 5, because the optical fiber plug 11 and light emitting device holder 12 are available for the light emitting unit 10A. In this instance, the condenser lens units 15A are advantageous over the condenser lens units 15. For this reason, description is hereinafter focused on the condenser lens units 15.

The condenser lens 15ba has a rear surface 15bb and a front surface 15bc, and both surfaces 15bb/15bc are hyperboloids. In this instance, the hyperboloid of the front surface 15bc is sharper than the hyperboloid of the rear surface 15bb. Hyperboloids make the aberration smaller than the aberration of spherical surfaces. For this reason, the condenser lens 15ba is conducive to increase of the amount of light passing through a virtual plane vertical to the optical axis AX1. The light input end FBa is adjusted to a certain position on the optical axis where the cross section of the optical path is approximately equal in area to the light input end FBa. This results in enhancement of the coupling efficiency. The light-emitting diodes 13, condenser lens units 15A and bundles FB1 of optical fibers are maintained in the light-emitting device holder and optical fiber plug in such a manner that the lengths f1 and f2 are fixed to appropriate values. For this reason, the light emitting unit 10A achieves a high coupling efficiency between the light emitting device 13 and the bundle FB1 of optical fibers 2.

Third Embodiment

Figure 6:
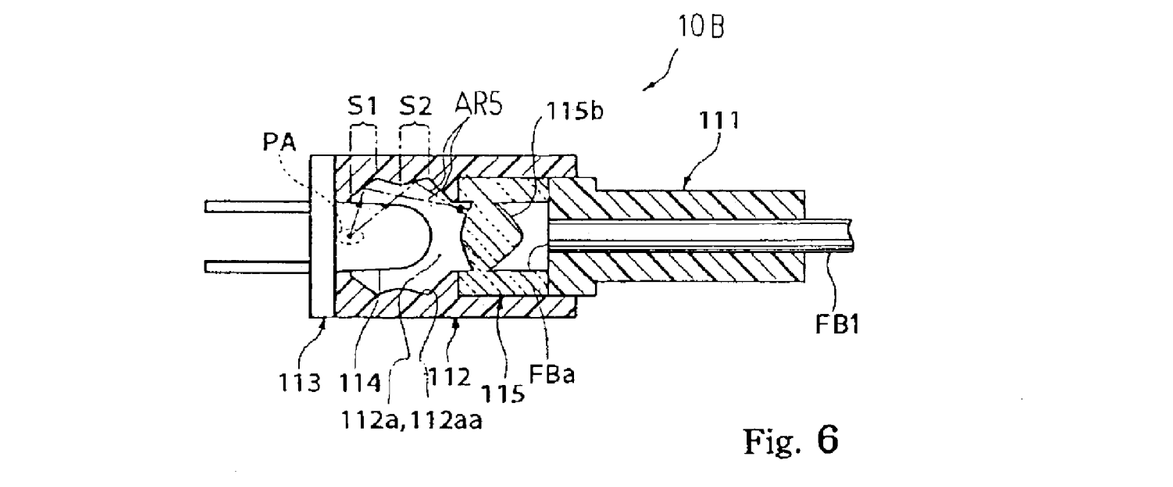
FIG. 6 is a cross sectional view showing the structure of yet another light emitting unit according to the present invention.

FIG. 6 shows yet another light emitting unit 10B embodying the present invention. The light emitting unit 10B forms a part of the optical sensor system, which in turn forms a part of the composite keyboard musical instrument. The light emitting unit 10B includes an optical fiber plug 111, a light-emitting device holder 112, a light emitting device 113 and a condenser lens unit 115. The optical fiber plug 111, light emitting device holder 112 and condenser lens unit 115 are made of the material used for the optical fiber plug 11, light emitting device holder 12 and condenser lens unit 15.

The optical fiber plug 111 is formed with through-holes, and bundles FB1 of optical fibers 2 are secured to the optical fiber plug 111 in the through-holes. The transparent adhesive compound may be used for securing the bundles FB1 to the inner surfaces of the optical fiber plug 111. The bundles FB1 of optical fibers 2 have respective light input ends FBa substantially coplanar with the rear surfaces of the optical fiber plug 111.

The light-emitting device holder 112 is formed with plural through-holes 112a, and the condenser lens unit 115 and light emitting device 113 are inserted into each of the through-holes. In detail, each through-hole 112a is partitioned into a front zone and a rear zone. The condenser lens unit 115 is snugly received in the front zone, and the convex lens 115b is confronted to the light input end FBa. On the other hand, the rear zone is assigned to the light emitting device 113, and the semi-ellipsoid piece 114 projects into the rear zone.

The rear zone is defined by curved surfaces 112aa, and highly reflective substance is deposited on the curved surfaces 112*aa*. When planes passing through the centerline of the through-hole 112*a* intersect with each curved surface 112*aa*, a parabola defines the cross sections. The highly reflective substance forms reflecting surfaces S1/S2, and the light is reflected on the reflecting surfaces S1/S2 toward the condenser lens 115*b*. The parabolas are expressed by different formulae so that the reflection on all the surfaces S1/S2 is directed to the condenser lens 115*b*.

Since the light-emitting device holder 112 is formed of ABS resin, the highly reflective substance is to be larger in reflectance than the ABS resin. It is preferable that the highly reflective substance is less liable to rust. In this instance, nickel is deposited on the inclined surfaces 112*aa*. However, other sorts of metal/alloy are available for the reflecting surfaces S1/S2 in so far as they fulfill the above-conditions. An evaporation technique, an ion-plating and a sputtering technique are available for the deposition.

When the light emitting device 13 is energized, light is emitted from the light emitting device 13. Part of the light is directly incident on the condenser lens 115*b*. Another part of the light is reflected on the reflection surfaces S1/S2, and the reflection is incident onto the condenser lens 115*b* as indicated by arrows AR5. Thus, the light is less liable to be absorbed, and a large mount of light is incident on the condenser lens 115*b*. The incident light is condensed onto the light input end FBa of the bundle FB1. For this reason, the coupling efficiency is surely improved.

Although particular embodiments of the present invention have been shown and described, it will be apparent to those skilled in the art that various changes and modifications may be made without departing from the spirit and scope of the present invention.

The optical sensor system according to the present invention is available for another sort of keyboard musical instrument such as, for example, an automatic player piano and electronic keyboard. The keyboard musical instruments do not set any limit to the scope of the present invention. The optical sensor system may be incorporated in another sort of musical instrument such as, for example, an electronic stringed instrument, an electronic wind instrument and an electronic percussion instrument for converting the vibrations of the strings, key motion, sticking and vibrations of skin or tone bars to electric signals. Moreover, the optical sensor system and/or light emitting unit according to the present invention may be used in industrial machines, electric good and medical equipment.

In the first, second and third embodiments, the positioning device, i.e., the spigots 11*d*/socket 12*c*, gaps 11*e*2/projections 12*d*1/12*d*2, shoulder 12*e*/cylindrical body 15*f*/inner surface defining the through-hole 12*aa* and peripheral surface 14*a*/tail 15*d*/rear surface 15*g*/surface 16*a*, the convex surface such as a hyperboloid and the reflection surface S1/S2 make the amount of light incident into the light input end FBa increased, respectively. Two of these particular features may be incorporated in another light emitting unit according to the present invention. For example, the light emitting device holder 12B may be replaced with the light emitting device holder 12 so that the amount of incident light is further increased by virtue of the highly reflective inner surfaces S1/S2 as well as the automatic alignment between the condenser lenses 15*b*/15*ba* and the bundles FB1 of optical fibers 2.

Another light emitting unit according to the present invention may have all the particular features of the first, second and third embodiments. In other words, the condenser lenses 15*ba* and highly reflective inner surfaces S1/S2 may be incorporated in the light emitting unit 10.

At least one optical fiber may be connected to the light emitting unit.

A condenser lens may have only one surface of a hyperboloid. The other surface may be flat. The hyperboloids are effective against the aberration. However, the hyperboloids do not set any limit to the scope of the present invention. Any lens surface is available for the condenser lens in so far as the lens surface makes the aberration less than that of the spherical lens surface. The lens surfaces may be expressed by a polynomial, an exponential function, an inverse hyperbolic function, a parabolic function or Bezier function.

A light emitting device holder may be made of highly reflective substance. In this instance, any metal or alloy is not deposited on the curved surfaces 112*aa*.

The parabola is a mere example of the preferable curved surface. The reflection surfaces S1/S2 may be inclined surfaces or a single inclined surface. A Fresnel mirror may be formed on the inner surface defining the through-hole. The reflection surfaces may be more than two. Any sort of surface is available for the reflection surface or surfaces in so far as the light is directed toward the condenser lens.

Claim languages are correlated with the components of the embodiments as follows. The optical fiber plug 11/111 and light-emitting device holder 12/112 as a whole constitute a casing. The spigots 11*d*/socket 12*c*, gaps 11*e*2/projections 12*d*1/12*d*2, shoulder 12*e*/cylindrical body 15*f*/inner surface defining the through-hole 12*aa* and peripheral surface 14*a*/tail 15*d*/rear surface 15*g*/surface 16*a* as a whole constitute a light increaser in the first embodiment. The hyperboloid lens 15*b* serves as the light increaser in the second embodiment, and the reflection surfaces S1/S2 as a whole constitute the light increaser in the third embodiment.

In the first embodiment, the spigots 11*d*/socket 12*c* and gaps 11*e*2/projections 12*d*1/12*d*2 as a whole constitute a first positioner, the shoulder 12*e*, cylindrical body 15*f* and inner surface defining the through-hole 12*aa* form in combination a second positioner, and the peripheral surface 14*a*, tail 15*d*, rear surface 15*g* and surface 16*a* as a whole constitute a third positioner.

The controller 1*m* and headphone 1*n* as a whole constitute a sound generating system, and each of the black/white keys 1*i* serves as at least one movable object.

The entire content of Priority Document 2002-125867 is incorporated herein by reference.

What is claimed is:

1. A light emitting unit comprising:
    a light emitting device for converting electric power to light;
    at least one optical fiber having a light input end on which said light is incident;
    a condenser lens having an optical axis, and provided between said light emitting device and said light input end for condensing said light onto said light input end;
    a casing formed with a hollow space for keeping said light emitting device, said condenser lens and said light input end at intervals; and
    a light increaser formed in at least one of said casing, said condenser lens and the inner surface of said casing defining said hollow space for increasing the amount of light incident onto said light input end,
    said light increaser being a positioning device for disposing said light input end at a certain point on said optical axis,
    said positioning device having
    a first positioner for making a center of said light input end aligned with a centerline of said casing, a second positioner for making said optical axis of said condenser unit coincident with said centerline of said casing, and a third positioner for making a centerline of said light emitting device aligned with said optical axis of said condenser unit.

said second positioner having an inner surface of said casing defining said through-hole, a shoulder portion formed in said casing in such a manner as to project into said through-hole of said casing and a body of said condenser lens unit held in contact with said shoulder and slidable on said inner surface in such a manner that said optical axis is coincident with said centerline of said casing.

2. A light emitting unit comprising:

a light emitting device for converting electric power to light;

at least one optical fiber having a light input end on which said light is incident;

a condenser lens having an optical axis, and provided between said light emitting device and said light input end for condensing said light onto said light input end;

a casing formed with a hollow space for keeping said light emitting device, said condenser lens and said light input end at intervals; and a light increaser formed in at least one of said casing, said condenser lens and the inner surface of said casing defining said hollow space for increasing the amount of light incident onto said light input end, said light increaser being a positioning device for disposing said light input end at a certain point on said optical axis, said positioning device a first positioner for making a center of said light input end aligned with a centerline of said casing, a second positioner for making said optical axis of said condenser unit coincident with said centerline of said casing, and a third positioner for making a centerline of said light emitting device aligned with said optical axis of said condenser lens unit.

said condenser lens unit being formed with a recess having a centerline coincident with said optical axis, said third positioner having a peripheral surface of said light emitting device, a first reference surface of said light emitting device to which a centerline of said light emitting device is normal and a tail formed an opening of said recess and resiliently pinching said peripheral surface in such a manner that said centerline of said light emitting device is coincident with said optical axis and a second reference surface of said tail held in contact with said first reference surface.

3. A light emitting unit comprising a light emitting device for converting electric power to light;

at least one optical fiber having a light input end on which said light is incident;

a condenser lens having an optical axis, and provided between said light emitting device and said light input end for condensing said light onto said light input end;

a casing formed with a hollow space for keeping said light emitting device, said condenser lens and said light input end at intervals; and a light increaser formed in at least one of said casing, said condenser lens and the inner surface of said casing defining said hollow space for increasing the amount of light incident onto said light input end.

said light increaser being a convex surface of a condenser lens incorporated in said condenser lens unit and defined by a function which makes said condenser lens smaller in aberration than another condenser lens having a part of a spherical surface.

4. The light emitting unit as set forth in claim 3, in which said function defines a hyperboloid.

5. The light emitting unit comprising a light emitting device for converting electric power to light;

at least one optical fiber having a light input end on which said light is incident;

a condenser lens having an optical axis, and provided between said light emitting device and said light input end for condensing said light onto said light input end;

a casing formed with a hollow space for keeping said light emitting device, said condenser lens and said light input end at intervals; and a light increaser formed in at least one of said casing, said condenser lens and the inner surface of said casing defining said hollow space for increasing the amount of light incident onto said light input end, said light increaser being a reflection surface defining a part of said through-hole of said casing between said condenser lens unit and said light emitting device.

6. The light emitting unit as set forth in claim 5, in which said reflection surface is made of a substance higher in reflectivity than a material forming said casing.

7. The light emitting unit as set forth in claim 5, in which said reflection surface is inclined for directing said light toward said condenser lens unit.

8. A light emitting unit comprising:

a light emitting device for converting electric power to light;

at least one optical fiber having a light input end on which said light is incident;

a condenser lens having an optical axis, and provided between said light emitting device and said light input end for condensing said light onto said input end;

a casing formed with a hollow space for keeping said light emitting device, said condenser lens and said light input end at intervals; and a light increaser formed in at least one of said casing, said condenser lens and the inner surface of said casing defining said hollow space for increasing the amount of light incident onto said light input end.

said light increaser having a positioning device for disposing said light input end at a certain point on said optical axis and a convex surface of a condenser lens incorporated in said condenser lens unit and defined by a function which makes said condenser lens smaller in aberration than another condenser lens having a part of a spherical surface.

9. The light emitting unit as set forth in claim 8, in which said positioning device has a first positioner for making a center of said light input end aligned with a centerline of said casing, a second positioner for making said optical axis of said condenser unit coincident with said centerline of said casing, and a third positioner for making a centerline of said light emitting device aligned with said optical axis of said condenser lens unit, and said function defines a hyperboloid.

10. A light emitting unit comprising:
a light emitting device for converting electri power to light;
at least one optical fiber having a light input end on which said light is incident;
a condenser lens having an optical axis, and provided between said light emitting device and said light input end for condensing said light onto said light input end;
a casing formed with a hollow space for keeping said light emitting device, said condenser lens and said light input end at intervals; and
a light increaser formed in at least one of said casing, said condenser lens and the inner surface of said casing defining said hollow space for increasing the amount of light incident onto said light input end.
said light increaser having a positioning device for disposing said light input end at a certain point on said optical axis and a reflection surface defining a part of said through-hole of said casing between said condenser lens unit and said light emitting device.

11. The light emitting unit as set forth in claim 10, in which said positioning device has
a first positioner for making a center of said light input end aligned with a centerline of said casing,
a second positioner for making said optical axis of said condenser unit coincident with said centerline of said casing, and
a third positioner for making a centerline of said light emitting device aligned with said optical axis of said condenser lens unit, and
said reflection surface is made of a substance higher in reflectivity than a material forming said casing for increasing said light directed toward said condenser lens unit.

12. A light emitting unit comprising:
a light emitting device for converting electric power to light;
at least one optical fiber having a light input end on which said light is incident;
a condenser lens having an optical axis, and provided between said light emitting device and said light input end for condensing said light onto said input end;
a casing formed with a hollow space for keeping said light emitting device, said condenser lens and said light input end at intervals; and
a light increaser formed in at least one of said casing, said condenser lens and the inner surface of said casing defining said hollow space for increasing the amount of light incident onto said light input end.
said light increaser having a convex surface of a condenser lens incorporated in said condenser lens unit and defined by a function which makes said condenser lens smaller in aberration than another condenser lens having a part of a spherical surface and a reflection surface defining a part of said through-hole of said casing between said condenser lens unit and said light emitting device for increasing said light directed toward said condenser lens unit.

13. The light emitting unit as set forth in claim 12, in which said function defines a hyperboloid, and said reflection surface is made of a substance higher in reflectivity than a material forming said casing.

14. The light emitting unit
a light emitting device for converting electric power to light;
at least one optical fiber having a light input end on which said light is incident;
a condenser lens having an optical axis, and provided between said light emitting device and said light input end for condensing said light onto said input end;
a casing formed with a hollow space for keeping said light emitting device, said condenser lens and said light input end at intervals; and
a light increaser formed in at least one of said casing, said condenser lens and the inner surface of said casing defining said hollow space for increasing the amount of light incident onto said light input end.
said light increaser having a positioning device for disposing said light input end at a certain point on said optical axis and a convex surface of a condenser lens incorporated in said condenser lens unit and defined by a function which makes said condenser lens smaller in aberration than another condenser lens having a part of a spherical surface and a reflection surface defining a part of said through-hole of said casing between said condenser lens unit and said light emitting device for increasing said light directed to said condenser lens unit.

15. An optical sensor system comprising:
at least one outward optical fiber having a first light input end and a first light output end, and offering an outward path to a light;
at least one light radiating optical sensor head connected to said first light output end, and radiating said light in a certain direction;
at least one light receiving optical sensor head opposed to said at least one light radiating optical sensor head, and receiving said light radiated from said at least one light radiating optical sensor head;
at least one homeward optical fiber having a second light input end connected to said at least one light receiving optical sensor head and a second light output end, and offering a homeward path to said light;
at least one obstacle secured to a moving object, and having a trajectory across said light radiated from said at least one light radiating optical sensor head to said at least one light receiving optical sensor head for intersecting said light during a travel along said trajectory;
a light detecting unit connected to said second light output end for converting said light to an electric signal; and
a light emitting unit connected to said first light input end, and including
a light emitting device for converting electric power to said light,
a condenser lens having an optical axis and provided between said light emitting device and said first light input end for condensing said light onto said first light input end,
a casing formed with a hollow space for keeping said light emitting device, said condenser lens and said first light input end at intervals and
a light increaser formed in at least one of said casing, said condenser lens and the inner surface of said casing defining said hollow space for increasing the amount of said light incident onto said first light input end.

16. The optical sensor system as set forth in claim 15, in which said light increaser is a positioning device for disposing said light input end at a certain point on said optical axis.

17. The optical sensor system as set forth in claim 15, in which said light increaser is a convex surface of a condenser lens incorporated in said condenser lens unit and defined by a function which makes said condenser lens smaller in aberration than another condenser lens having a part of a spherical surface.

18. The optical sensor system as set forth in claim 17, in which said function defines a hyperboloid.

19. The optical sensor system as set forth in claim 15, in which said light increaser is a reflection surface defining a part of said through-hole of said casing between said condenser lens unit and said light emitting device.

20. The optical sensor system as set forth in claim 15, in which said moving object is a part of a musical instrument.

21. A musical instrument for electronically generating sound, comprising:

a sound generating system for electronically generating said sound;

at least one movable object moved by a player for requesting said sound generating system to electronically generate said sound; and an optical sensor system monitoring said at least one movable object, and connected to said sound generating system for notifying said sound generating system of the player's request, said optical sensor system including at least one outward optical fiber having a first light input end and a first light output end and offering an outward path to a light, at least one light radiating optical sensor head connected to said first light output end and radiating said light across a trajectory of said at least one movable object, at least one light receiving optical sensor head opposed to said at least one light radiating optical sensor head and receiving said light radiated from said at least one light radiating optical sensor head across said trajectory, at least one homeward optical fiber having a second light input end connected to said at least one light receiving optical sensor head and a second light output end and offering a homeward path to said light, at least one obstacle secured to said at least one moving object, intersecting said light during a travel of said at least one moving object along said trajectory, a light detecting unit connected to said second light output end for converting said light to an electric signal representative of said player's request and a light emitting unit connected to said first light input end and having a light emitting device for converting electric power to said light, a condenser lens having an optical axis and provided between said light emitting device and said first light input end for condensing said light onto said first light input end, a casing formed with a hollow space for keeping said light emitting device, said condenser lens and said first light input end at intervals and a light increaser formed in at least one of said casing, said condenser lens and the inner surface of said casing defining said hollow space for increasing the amount of said light incident onto said first light input end, the optical sensor system as set forth in claim 16, in which said light increaser is a positioning device for disposing said light input end at a certain point on said optical axis.

22. The musical instrument as set forth in claim 21, in which said light increaser is a convex surface of a condenser lens incorporated in said condenser lens unit and defined by a function which makes said condenser lens smaller in aberration than another condenser lens having a part of a spherical surface.

23. The musical instrument as set forth in claim 21, in which said function defines a hyperboloid.

24. The musical instrument as set forth in claim 21, in which said light increaser is a reflection surface defining a part of said through-hole of said casing between said condenser lens unit and said light emitting device.

* * * * *